April 21, 1942.  H. J. HORN  2,280,584
LOCKING RING FOR WHEELS
Filed Dec. 14, 1939   3 Sheets-Sheet 1
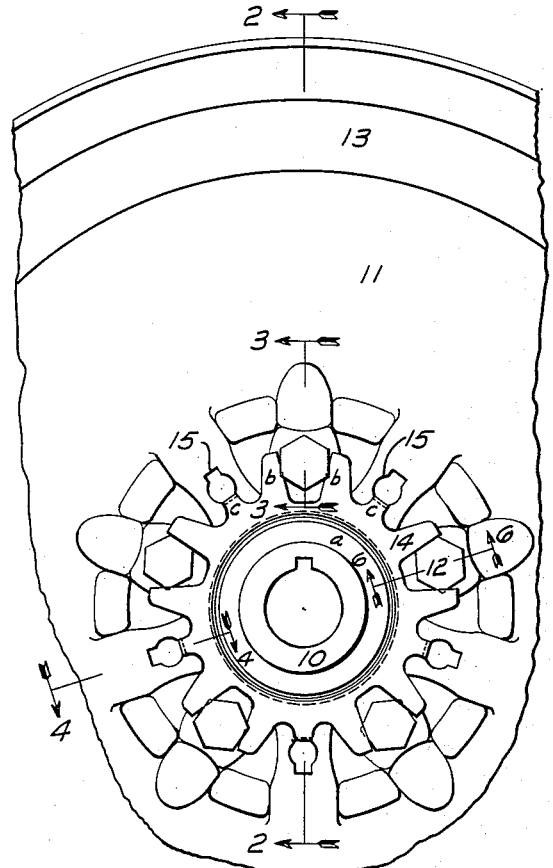
FIG. 1
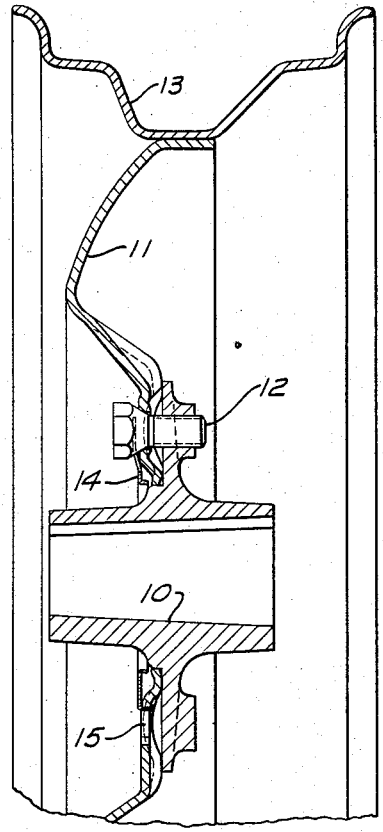
FIG. 2
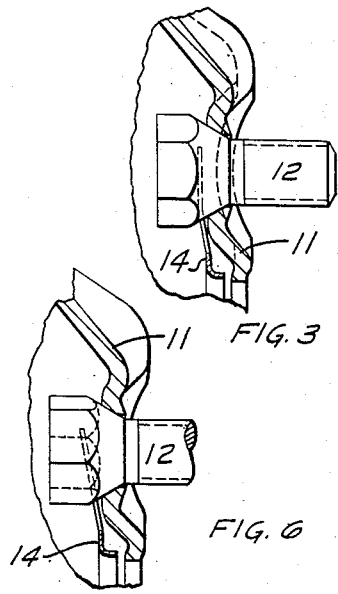
FIG. 3
FIG. 6
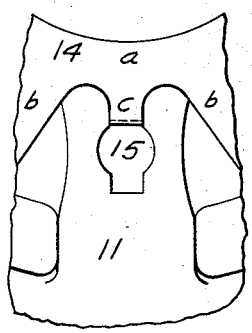
FIG. 5
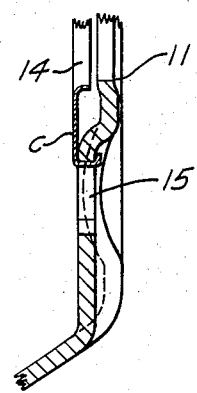
FIG. 4
INVENTOR.
HARRY J. HORN
BY Carroll R. Taber
ATTORNEY.

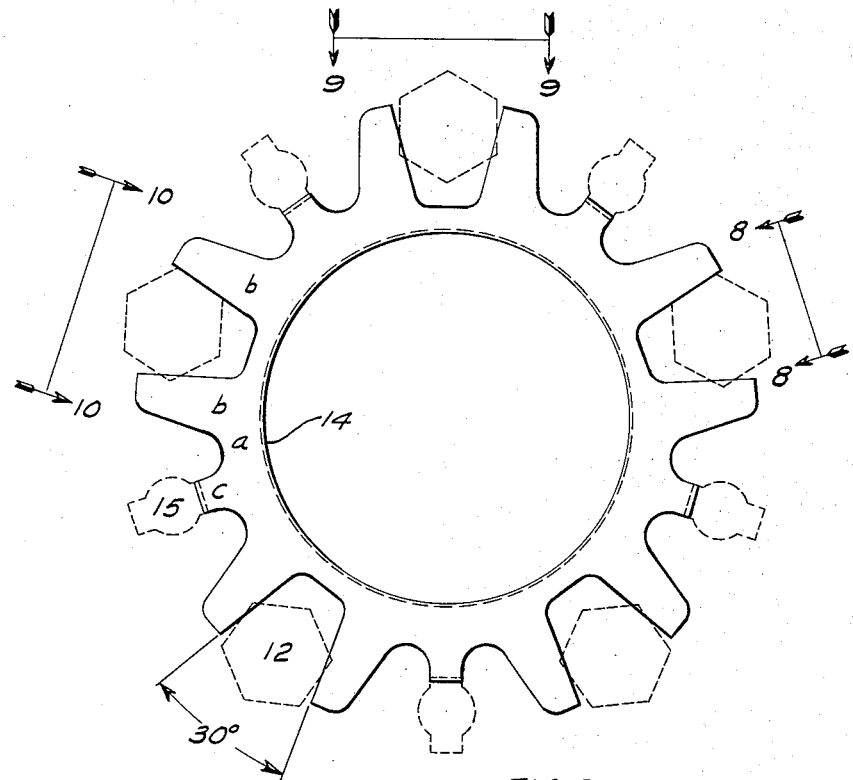
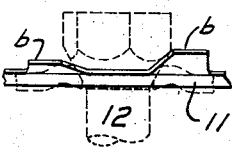 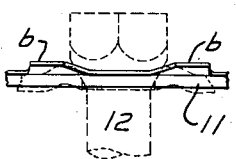 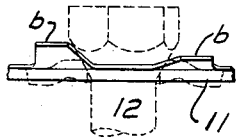
FIG. 8    FIG. 9    FIG. 10
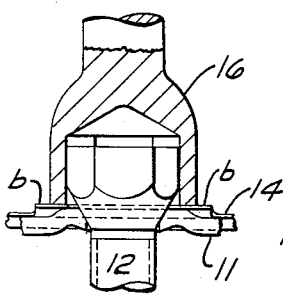
FIG. 11
INVENTOR.
HARRY J. HORN
BY
Carroll R. Taber
ATTORNEY.

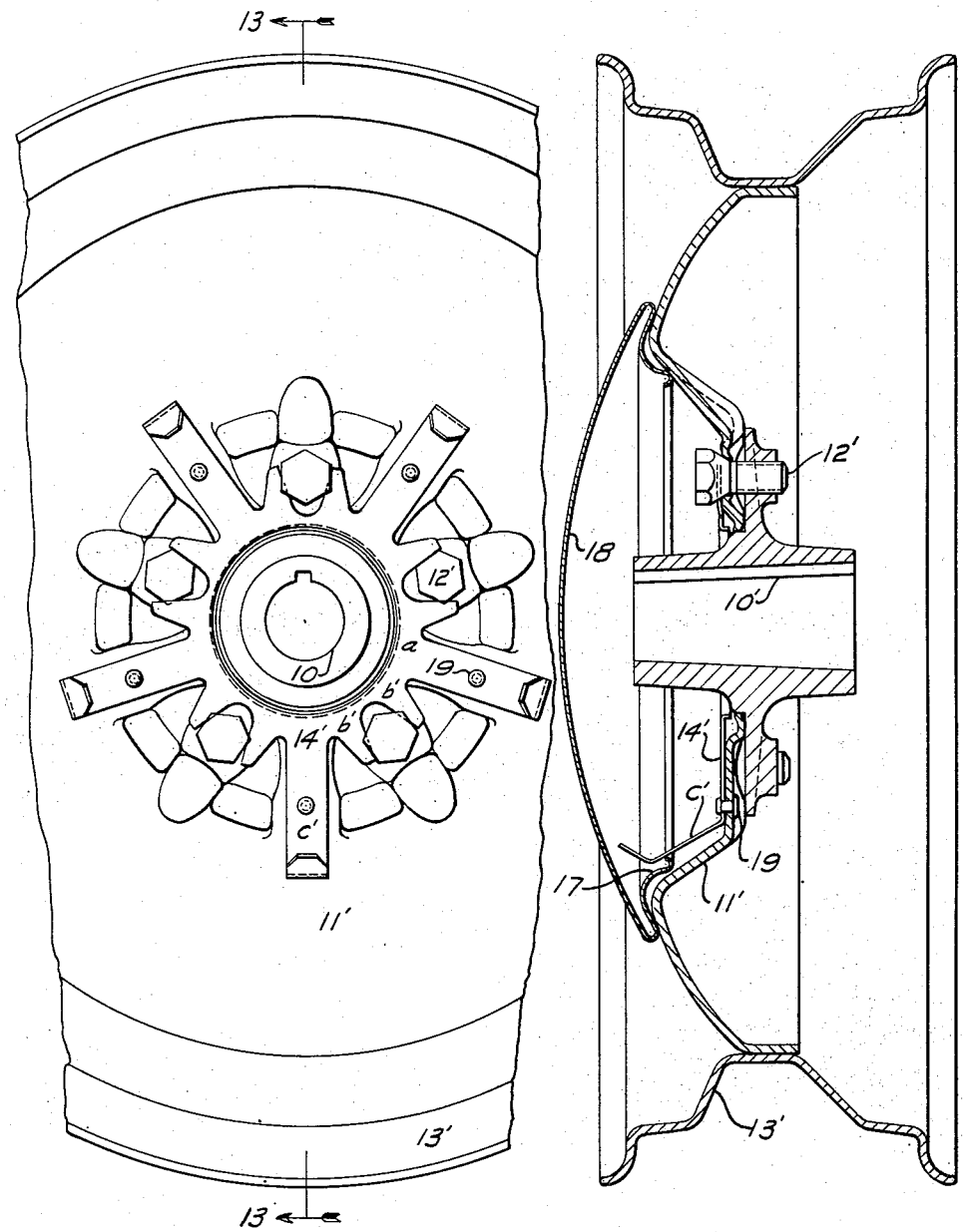

Patented Apr. 21, 1942

2,280,584

UNITED STATES PATENT OFFICE 2,280,584

LOCKING RING FOR WHEELS

Harry J. Horn, Lansing, Mich., assignor to Motor Wheel Corporation, Lansing, Mich., a corporation of Michigan Application December 14, 1939, Serial No. 309,135

7 Claims. (Cl. 301—9)

This invention relates broadly to vehicle wheels and more specifically to a novel form of locking ring adapted for use with a vehicle wheel of conventional form to lock the wheel securing means in place and which may also include means to detachably connect to the wheel an ornamental wheel cover. One of the outstanding advantages of this invention resides in its economy and simplicity. The locking ring comprises an annular base portion having a plurality of arms extending radially therefrom. Certain of said arms are arranged in pairs and so located and proportioned as to lock the wheel securing means against rotation. Others of said arms may be formed to provide attaching fingers adapted to be sprung into engagement wtih a cooperating portion of a wheel cover to detachably connect the latter to the wheel. The ring can be easily applied to a conventional form of wheel without necessitating any change in any of the wheel parts.

Two embodiments of the present invention are illustrated in the accompanying drawings and described in the following specification. Other embodiments will be readily apparent to those skilled in the art, all of which are included within the scope of this invention to the extent that they are defined in the appended claims.

In the drawings:

Figure 1 is a fragmentary front view of a wheel embodying the present invention;

Figure 2 is a sectional view taken on the line 2—2 of Figure 1;

Figure 3 is an enlarged sectional view taken on the line 3—3 of Figure 1;

Figure 4 is an enlarged sectional view taken on the line 4—4 of Figure 1;

Figure 5 is an enlarged front view of Figure 4;

Figure 6 is an enlarged sectional view taken on the line 6—6 of Figure 1;

Figure 7 is an enlarged front view of the locking ring forming a part of the present invention illustrating diagrammatically the relation to certain associated wheel parts;

Figures 8, 9 and 10 are fragmentary radial views taken on the lines indicated in Figure 7;

Figure 11 is a fragmentary sectional view similar to Figures 8, 9 and 10 showing the manner in which a socket wrench is applied to the securing means;

Figure 12 is a fragmentary view of a wheel illustrating a modified form of the invention; and Figure 13 is a sectional view taken on the line 13—13 of Figure 12 and showing the application of a wheel cover to the wheel of Figure 12.

Referring to Figures 1 and 2, there is shown a wheel comprising a hub 10, a wheel body 11 secured to the hub by cap screws 12, and a rim 13 mounted on the periphery of the wheel body 11. The structure thus far described is merely a conventional wheel assembly all the parts of which are old and well known in the art.

The novelty of the present invention resides in locking ring 14, now to be described, and its cooperative relation to the conventional wheel above described. The locking ring 14 comprises an annular base $a$ and a plurality of radial arms $b$ and $c$. Wheel body 11 is provided with a plurality of pilot openings 15 located intermediate the openings which receive cap screws 12. Arms $c$ correspond in number and location to openings 15. The ring 14 is secured to the wheel body 11 by flanging over the ends of arms $c$ so that they extend through the openings 15 and engage the inner face of wheel body 11 as clearly shown in Figure 4. Preferably the base $a$ and the arms $c$ of ring 14 lie in a common plane which is parallel to the general plane of the central portion of wheel body 11, as shown.

The arms $b$ of ring 14 are resilient and normally extend at an inclination to the base $a$. They are arranged in pairs with the inner edge of each arm of the pair diverging from the other arm. Each pair of arms is associated with one of the cap screws 12, with one arm on each side of the cap screw. Cap screws 12 have polygonal heads joined to a reduced threaded shank by a tapered section. The arms $b$ of each pair are so arranged that they will receive therebetween the reduced shank and tapered section of the associated cap screw but are not spaced sufficiently to receive the polygonal head. However, they are spaced so that when the proximate face of the head is parallel with the inner edge of one of the arms of a pair that arm will spring into engagement with such proximate face. These alternative positions of the arms $b$ and the head of cap screws 12 are shown in Figures 3 and 6 and Figures 9 and 10, respectively.

As previously mentioned, arms $b$ normally extend away from the base $a$ of ring 14 at an angle thereto. In other words, the unflexed position of the arms $b$ is that shown in Figure 6 and at the left side of Figure 10. Thus, before the cap screws 12 are installed all of the arms $b$ occupy the positions shown in Figure 6. In threading the cap screws home to secure the wheel body to the hub, a socket wrench 16 is employed. As shown in Figure 11, the socket wrench flexes the arms b away from the head of the cap screw so that the arms do not interfere with the installation thereof. The same is true, of course, when the cap screw is removed.

The various positions of the arms b with respect to the head of cap screw 12, when the cap screw is threaded home, are illustrated in Figures 8, 9 and 10. In Figure 8, the right arm b is engaging the proximate face of the head and the left arm is held below the head. In Figure 9, both arms are held below the head. In Figure 10, the left arm is engaging the proximate face of the head and the right arm is held below the head. In other words, the proximate face of the head is parallel to the right arm in Figure 8; the proximate face is parallel to the left arm in Figure 10; and neither of the faces proximate to the two arms are parallel thereto in Figure 9.

From the foregoing description it will be understood that whenever a cap screw 12 is rotated to a position where a face thereof is parallel with the inner edge of the proximate arm b, that arm will spring into engagement with such face and prevent further rotation of the cap screw until such arm has been flexed away from the head, as by the wrench 16. The arms b of each pair are so arranged with respect to each other that when one arm is in parallel engagement with the face of the cap screw proximate to that arm, the other arm intersects the plane of two other faces adjacent to each other. By this arrangement of the arms the cap screw is brought into locking position by a rotation of one half the number of degrees which would be required if only one arm were employed. If the head of the cap screw has an even number of faces, then the angle between the arms b will be one-half the angle at the center of the head which is subtended by a face of the head. In the drawings the heads are shown as hexagonal so that the angle subtended by any face of the head is 60 degrees. The inner edges of the arms b of each pair of arms are shown as arranged at an angle of 30 degrees with respect to each other. The inner edges of the arms b of each pair of arms diverge from each other at an angle of thirty degrees. Thus, the cap screw cannot be rotated more than thirty degrees without being locked against farther rotation by one of the arms b engaging the proximate face of the head. This relation of parts is one of the outstanding novel features of the present invention.

The structure shown in Figures 12 and 13 is an alternative embodiment of the invention. The conventional wheel parts are the same as previously described including a hub 10', a wheel body 11' secured to the hub by cap screws 12', and a rim 13' mounted on the periphery of the wheel body. The locking ring 14' is of slightly modified form. In this modification, the arms c' are longer than the arms b', and the arms c' are formed at their free extremities to be sprung into engagement with a cooperating flange 17 of a wheel cover 18. In this form of the invention the locking ring 14' is secured to the wheel body 11' by rivets 19. It will, of course, be understood that when the ring 14' is used, no other spring clips are required for attaching a cover to the wheel. Whereas, when the locking ring 14 is employed, conventional spring slips are required. Thus, this modified form of the invention not only provides a novel locking arrangement for the cap screws, but also takes the place of the conventional spring clips.

As indicated from the foregoing, the present invention resides in the locking ring itself and its cooperative relation to the associated parts of a conventional wheel structure. The scope of this invention is indicated by the appended claims.

I claim:

1. The combination with a wheel body having a plurality of circumferentially spaced openings for the reception of securing means, of a locking ring comprising an annular base portion provided with a plurality of radially extending arms, means for securing certain of said arms to said wheel body, others of said arms being arranged in pairs with the arms of each pair located on opposite sides of an opening for the securing means, adjacent edges of each pair of arms diverging outwardly from the center of the locking ring, said last mentioned arms being resilient and extending away from the wheel body at an inclination thereto.

2. The combination with a wheel body having a plurality of circumferentially spaced openings for the reception of securing means and a plurality of openings arranged intermediate said last mentioned openings for the reception of pilot means, of a locking ring comprising an annular base portion provided with a plurality of radially extending arms, certain of said arms extending through said pilot openings and being flanged to lock the ring to the wheel body, others of said arms extending away from the wheel body at an inclination thereto and having an edge arranged adjacent the openings for the securing means, said last mentioned arms being resilient and adapted to be deflected axially of the wheel body.

3. The combination with a wheel body having a plurality of circumferentially spaced openings for the reception of securing means and a plurality of openings arranged intermediate said last mentioned openings for the reception of pilot means, of a locking ring comprising an annular base portion provided with a plurality of radially extending arms, certain of said arms extending through said pilot openings and being flanged to lock the ring to the wheel body, others of said arms being arranged in pairs with the arms of each pair located on opposite sides of an opening for the securing means, adjacent edges of each pair of arms diverging outwardly from the center of the locking ring, said last mentioned arms being resilient and extending away from the wheel body at an angle thereto.

4. The combination with a wheel body having a plurality of circumferentially spaced openings for the reception of securing means, of a locking ring comprising an annular base portion provided with a plurality of radially extending arms, certain of said arms being secured to said wheel body and having means integral therewith for the attachment of a cover thereto, others of said arms extending away from the wheel body at an inclination thereto and having an edge arranged adjacent the openings for the securing means, said last mentioned arms being resilient and adapted to be deflected axially of the wheel body.

5. In combination, a hub, a wheel body, screw threaded securing means for detachably connecting the wheel body to the hub, each of said securing means including a polygonal head portion having an even number of faces, and means for locking the securing means against rotation comprising a locking element having a base portion secured to one of said parts and a pair of angularly spaced axially flexible arms arranged at opposite sides of one of said securing means, adjacent edges of said arms being disposed at an angle to each other of substantially one-half the angle subtended by a face of the polygonal head portion whereby when the inner edge of one of said arms is in parallel engagement with the proximate face of the head the inner edge of the other arm extends at an angle to the proximate face of the head, said locking element having other angularly spaced radially extending arms secured to said wheel body, said last mentioned arms having means integral therewith for the attachment of a cover thereto.

6. The combination with a wheel body adapted for demountable attachment to a wheel hub by means having screw threaded engagement with said hub, said wheel body having a plurality of openings therein for the reception of said screw threaded means; of a locking ring comprising an annular base portion fixedly attached to said wheel body and provided with a plurality of resilient radial arms extending away from the base at an inclination to the plane of the base, said arms being arranged in pairs with the arms of each pair located on opposite sides of an opening for the reception of said screw threaded means, adjacent edges of each pair of arms diverging outwardly from the center of the locking ring.

7. In combination, a hub, a wheel body, screw threaded securing means for detachably connecting the wheel body to the hub, each of said securing means including a polygonal head portion having an even number of faces, and means for locking the securing means against rotation comprising a locking ring having an annular base portion secured to said wheel body and a pair of angularly spaced axially flexible arms arranged at opposite sides of each of said securing means, the adjacent edges of said arms being disposed at an angle to each other of substantially one-half the angle subtended by a face of the polygonal head portion whereby when the inner edge of one of said arms is in parallel engagement with the proximate face of the head the inner edge of the other arm extends at an angle to the proximate face of the head.

HARRY J. HORN.